US010365692B2

(12) United States Patent
 Yeh

(10) Patent No.: US 10,365,692 B2
(45) Date of Patent: Jul. 30, 2019

(54) DISPLAY APPARATUS

(71) Applicant: Wuhan China Star Optoelectronics Semiconductor Display Technology Co., Ltd., Wuhan, Hubei (CN)

(72) Inventor: Shang-Hung Yeh, Guangdong (CN)

(73) Assignee: Wuhan China Star Optoelectronics Semiconductor Display Technology Co., Ltd., Wuhan, Hubei (CN)

( * ) Notice: Subject to any disclaimer, the term of this patent is extended or adjusted under 35 U.S.C. 154(b) by 64 days.

(21) Appl. No.: 15/736,704

(22) PCT Filed: Oct. 20, 2017

(86) PCT No.: PCT/CN2017/107127
§ 371 (c)(1),
(2) Date: Dec. 14, 2017

(87) PCT Pub. No.: WO2019/029011
PCT Pub. Date: Feb. 14, 2019

(65) Prior Publication Data
US 2019/0041914 A1  Feb. 7, 2019

(30) Foreign Application Priority Data
Aug. 7, 2017  (CN) .......................... 2017 1 0674310

(51) Int. Cl.
*G06F 1/16* (2006.01)
(52) U.S. Cl.
CPC .......... *G06F 1/1652* (2013.01); *G06F 1/1616* (2013.01); *G06F 1/1641* (2013.01); *G06F 1/1647* (2013.01)

(58) Field of Classification Search
CPC .... G06F 1/1616; G06F 1/1681; G06F 1/1601; G06F 1/1613; G06F 1/1637; G06F 1/1656; G06F 1/1652; G06F 1/1641; G06F 1/1647
See application file for complete search history.

(56) References Cited

U.S. PATENT DOCUMENTS

| 9,348,450 B1 * | 5/2016 | Kim ....................... G06F 1/1681 |
| 2014/0042293 A1 * | 2/2014 | Mok ..................... G06F 1/1652 248/682 |

(Continued)

*Primary Examiner* — Dimary S Lopez Cruz
*Assistant Examiner* — Ingrid D Wright
(74) *Attorney, Agent, or Firm* — Andrew C. Cheng

(57) ABSTRACT

The present application discloses a display apparatus including a housing assembly, a connecting frame plate, a linkage and a flexible display panel, the housing assembly includes a middle frame and a housing pin jointed to each other; the connection frame plate is provided with a pivot connector pin jointed to the housing; the linkage is pin jointed to the middle frame and the pivot connector, respectively; the flexible display panel is disposed on surface of the middle frame; wherein the middle frames is abut against the housings when the housings rotated to make a distance between the second terminals of the two middle frames is greater than a distance between the first terminals. The bending perimeter of a folding region of the flexible display panel is increased to release the stress to prevent the folding region broken or damaged when the display apparatus is folded or expanded.

18 Claims, 10 Drawing Sheets

(56) References Cited

U.S. PATENT DOCUMENTS

| | | | |
|---|---|---|---|
| 2014/0355195 A1* | 12/2014 | Kee | G06F 1/1616 |
| | | | 361/679.27 |
| 2016/0062412 A1* | 3/2016 | Park | G06F 1/1616 |
| | | | 361/679.27 |
| 2016/0085265 A1* | 3/2016 | Park | G06F 1/1681 |
| | | | 361/807 |
| 2016/0135324 A1* | 5/2016 | Lee | F16M 13/00 |
| | | | 248/346.01 |
| 2016/0295709 A1* | 10/2016 | Ahn | H05K 5/0017 |
| 2016/0378203 A1* | 12/2016 | Kim | G06F 1/1616 |
| | | | 345/156 |
| 2017/0115701 A1* | 4/2017 | Bae | G06F 1/1652 |
| 2017/0141173 A1* | 5/2017 | Choi | G06F 1/1652 |
| 2017/0145725 A1* | 5/2017 | Siddiqui | E05F 3/20 |
| 2017/0374749 A1* | 12/2017 | Lee | E05D 11/0054 |

* cited by examiner

DISPLAY APPARATUS

FIELD OF THE INVENTION

The present application relates to a display technology field, and more particularly to a display apparatus.

BACKGROUND OF THE INVENTION

Mobile phones, tablet PCs, other display apparatuses are more and more common, and the requirements to large panel and portability are getting higher and higher. Therefore, the use of flexible or foldable flexible display can simultaneously meet the needs of large panel and portable.

During the long term development the inventors of the present application have found that in the present foldable display apparatus, the flexible display panel is liable to broken or damage in the folding region due to the generated stress by folding and expanding, thereby affecting the quality and display of the display apparatus.

SUMMARY OF THE INVENTION

The present application provides a display apparatus for solving the technical problem that the folding region of the foldable display apparatus of the conventional technology is broken or damaged due to stress when the foldable display apparatus is folded or expanded. In order to solve the above technical problem, a technical proposal adopted by the present application is to provide a display apparatus including:

a housing assembly including two housings and two middle frames, wherein first terminals of the middle frames are pin jointed to first terminals of the housings;

a connection frame plate including a pivot connector, second terminals of the two housings are pin jointed to the pivot connector;

a linkage including a first linkage, a second linkage, a first linkage connector, and a plurality of second linkage connectors, a first terminal of the first linkage pin jointed to the second linkage connector, a second terminal of the first linkage eccentrically pin jointed to the pivot connector, the second linkage respectively pin jointed to the first linkage connector and the plurality of second linkage connectors, the first linkage connector and the plurality of second linkage connectors respectively pin jointed to at least one of the two middle frames;

a flexible display panel disposed on surfaces of the two middle frames;

wherein the second terminals of the two middle frames abut against the second terminals of the housings when the two housings rotationally folded with respect to the connection frame plate to make a distance between the second terminals of the two middle frames is greater than a distance between the first terminals of the two middle frames, and the bending perimeter of a folding region of the flexible display panel increased to release the stress.

By providing the pivoting connectors and the linkage in the display apparatus of the present application, the housing assembly is pin jointed, such that the two housings in the housing assembly are rotationally folded with respect to the connection frame plate, the distance between the second terminals of the two middle frames is greater than the distance between the first terminals of the two middle frames, so that the bending perimeter of the folding region of the flexible display panel in the display apparatus is increased to release the stress, and to prevent the folding region from broken or damaged due to stress, when the display apparatus is folded or expanded, to improve the reliability of the display apparatus.

BRIEF DESCRIPTION OF THE DRAWINGS

In order to more clearly illustrate the embodiments of the present application or prior art, the following FIG.s will be described in the embodiments are briefly introduced. It is obvious that the drawings are merely some embodiments of the present application, those of ordinary skill in this field can obtain other FIG.s according to these FIG.s without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts acquired should be considered within the scope of protection of the present application.

Specifically, the terminologies in the embodiments of the present application are merely for describing the purpose of the certain embodiment, but not to limit the invention.

The present application will now be described in further detail with reference to the accompanying drawings and preferred embodiments.

Figure 1:
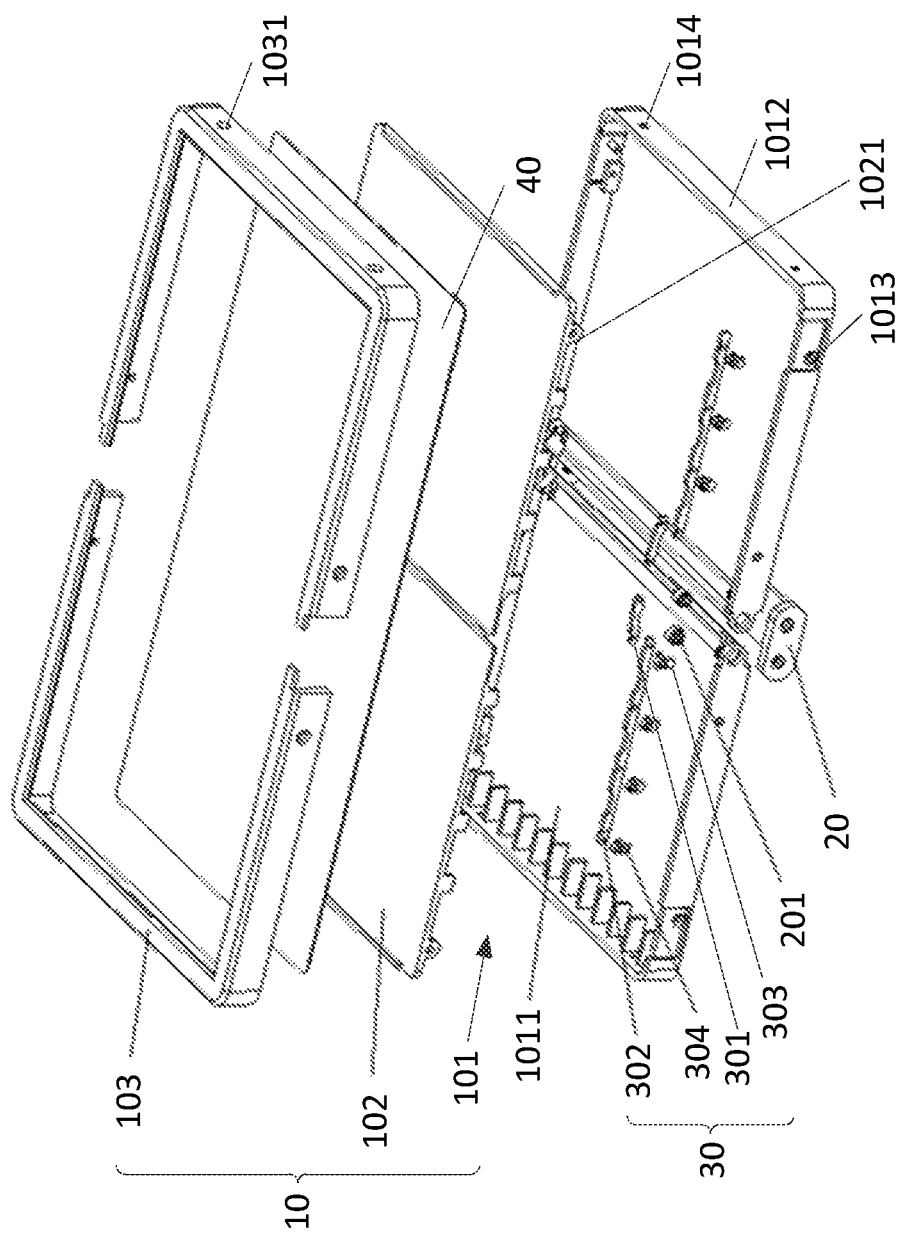
FIG. 1 is a schematic exploded structural view of a display apparatus structure in an embodiment of the present application.
Figure 2:
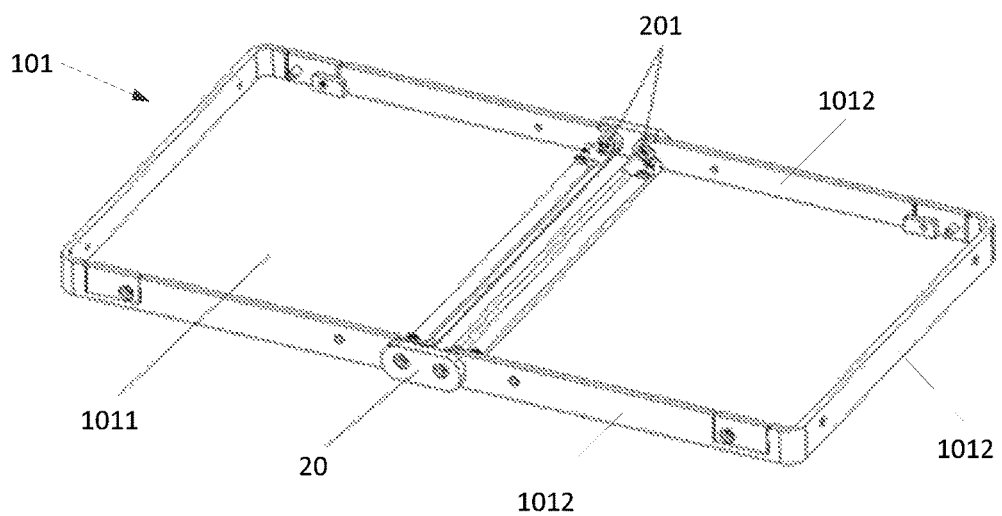
FIG. 2 is a schematic structural view of a housing and a connection frame plate in an embodiment of the display apparatus of the present application.

Referring to FIG. 1, a terminal fitting in an embodiment of the present application includes:

A housing assembly 10, the housing assembly 10 includes two housings 101 and two middle frames 102, a first terminal of the middle frame 102 is pin jointed to the first terminal of the housing 101;

Alternatively, the housing 101 may be made of plastic or metal material.

A connection frame plate 20 provided with a pivot connector 201, second terminals of the two housings 101 are pin jointed to the pivot connector 201; In the present embodiment, first terminals of the two housings 101 and the first terminals of the two middle frames 102 are closed to a terminal of the edge of the display apparatus; the second terminals of the two housings 101 and second terminals of the two middle frames 102 are closed to a terminal of the folding region.

A linkage 30 includes a first linkage 301, a second linkage 302, a first linkage connector 303, and a plurality of second linkage connectors 304, a first terminal of the first linkage 301 is pin jointed to the second linkage connector 304, a second terminal of the first linkage 301 is eccentrically pin jointed to the pivot connectors 201, the second linkage 302 is pin jointed to the first linkage connector 303 and the plurality of second linkage connectors 304, respectively, and the first linkage connector 303 and the plurality of second linkage connectors 304 are pin jointed to at least one of the two middle frames 102, respectively;

A flexible display panel 40, the flexible display panel 40 is disposed on surfaces of the two middle frames 102;

Alternatively, the flexible display 40 may be a flexible organic light emitting display, a flexible electrophoretic display, a flexible liquid crystal display, or a flexible electrowetting display.

Wherein the second terminals of the two middle frames 102 are abut against the second terminal of the housing 101 when the two housings 101 are rotationally folded with respect to the connection frame plate 20, such that the distance between the second terminals of the two middle frames 102 is greater than the distance between the first terminals of the two middle frames 102, and the bending perimeter of the folding region of the flexible display panel 40 is increased to release the stress.

In the present embodiment, the two housings 101 respectively include a bottom wall 1011 and a side wall 1012 connected to the bottom wall 1011, and the two middle frames 102 are opposite disposed to the bottom walls 1011 of the two housings 101, respectively; the first terminals of the middle frame 102 are respectively provided with first mounting holes 1021, and the side walls 1011 of the two housings 101 are respectively provided with second mounting holes 1013, the first mounting hole 1021 and the second mounting hole 1013 are fixed by a fixing member (not shown in the FIG.), so that the two housings 101 are pin jointed to the two middle frames 102; the distance between the two middle frames 102 and the bottom wall 1011 is greater than zero, so that the two housings 101 can be moved in the direction perpendicular to the bottom wall 1011, when the two housings 101 are rotationally folded with respect to the connection frame plate 20, so that the distance between the second terminals of the two middle frames 102 and the bottom wall 1011 is reduced.

Alternatively, the two housings 101 are also provided with a plurality of third mounting holes 1014, the display apparatus further includes two front frames 103, the front frames 103 are provided with a plurality of fourth mounting holes 1031 corresponding to the third mounting holes 1014, the third mounting hole 1014 and the fourth mounting hole 1031 are fixed by a fixing member (not shown in the FIG.), so that the two housings 101 are pin jointed to the two front frames 103.

Alternatively, the first mounting hole 1021, the second mounting hole 1013, the third mounting hole 1014, and the fourth mounting hole 1031 may be ordinary round holes, square holes or other shaped holes, or may be screw hole with circular, square or other shapes; The fixing member can be screws or bolts and so on. The first mounting holes 1021 and the second mounting holes 1013 may also be a structure that engages with each other, for example, one of it is a mounting posts and the other is a corresponding mounting hole. The third mounting hole 1014 and the fourth mounting hole 1031 may be a structure that engages with each other.

Referring to FIGS. 3 to 6, the pivot connector 201 includes a pivot portion 2011, a first pivot post 2012 disposed on a side of the pivot portion 2011, a fool-proofing fitting portion 2013 disposed on the other side of the pivot portion 2011, the pivot portion 2011 is used for pin jointing to the housing 101, the first pivot post 2012 is used for pin jointing to the second terminal of the first linkage 301, the fool-proofing fitting portion 2013 is used for fixed fitting with the connection frame plate 20.

In other embodiments, the pivot connector 204 may also include a first pivot portion 2041 and a second pivot portion 2044, one side of the first pivot portion 2041 is provided with at least two fixed posts 2042, the other side of the first pivot portion 2041 is provided with a fool-proofing fitting portion 2043, a side of the second pivot portion 2044 is provided with a pivot post 2045, the other side of the second pivot portion 2044 is provided with at least two fixing holes 2046, wherein the fool-proofing fitting portion 2043 is used for fixed fitting with the connection frame plate 20, the at least two fixed posts 2042 and the at least two fixing holes 2046 is fixing connected, the pivot post 2045 is used for pin jointing to the second terminal of the first linkage 301.

Figure 3:
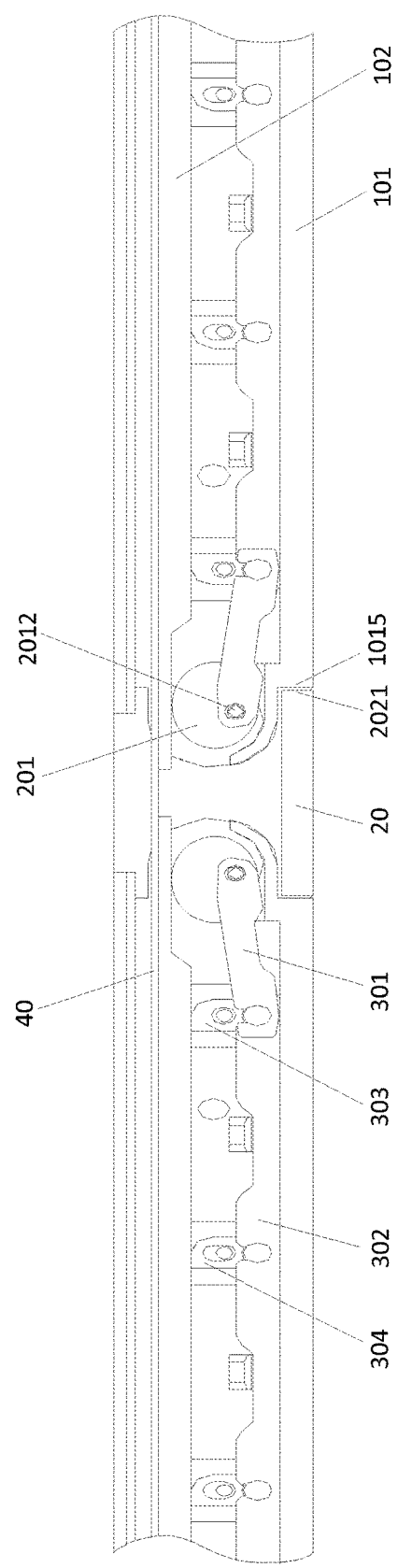
FIG. 3 is a schematic cross-sectional view of the initial state of the display apparatus in an embodiment of the present application.
Figure 4:
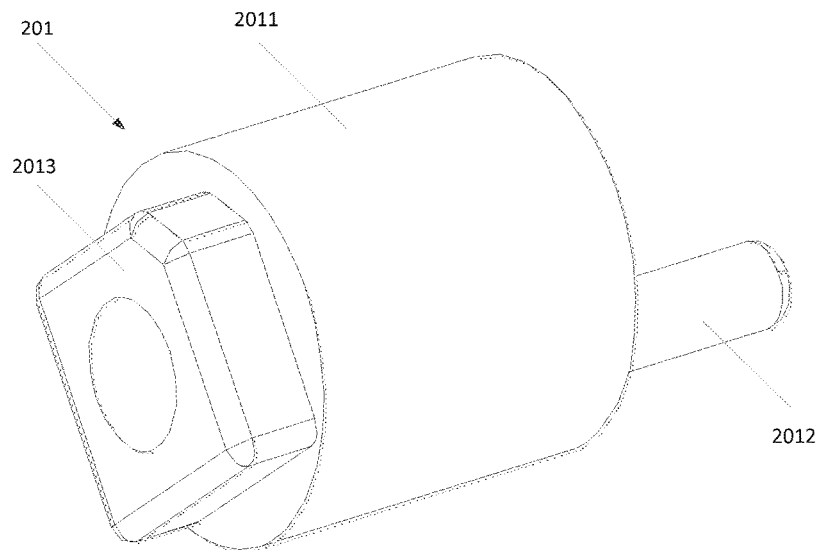
FIG. 4 is a schematic structural view of a pivotal connector of the display apparatus in an embodiment of the present application.
Figure 5:
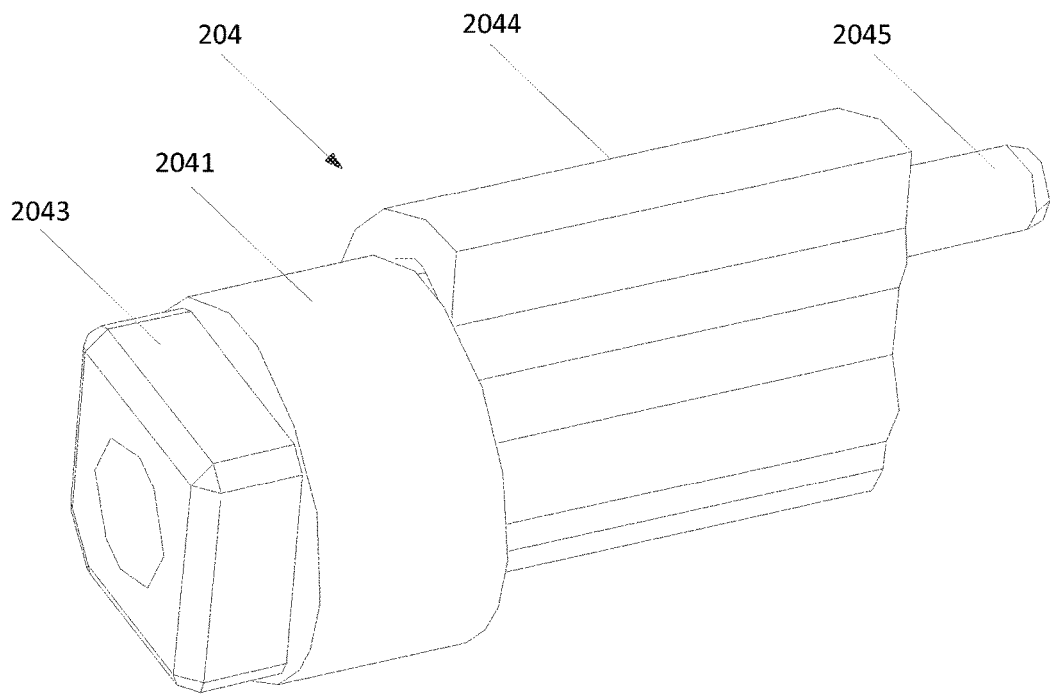
FIG. 5 is a schematic structural view of the pivotal connector of the display apparatus in another embodiment of the present application.
Figure 6:
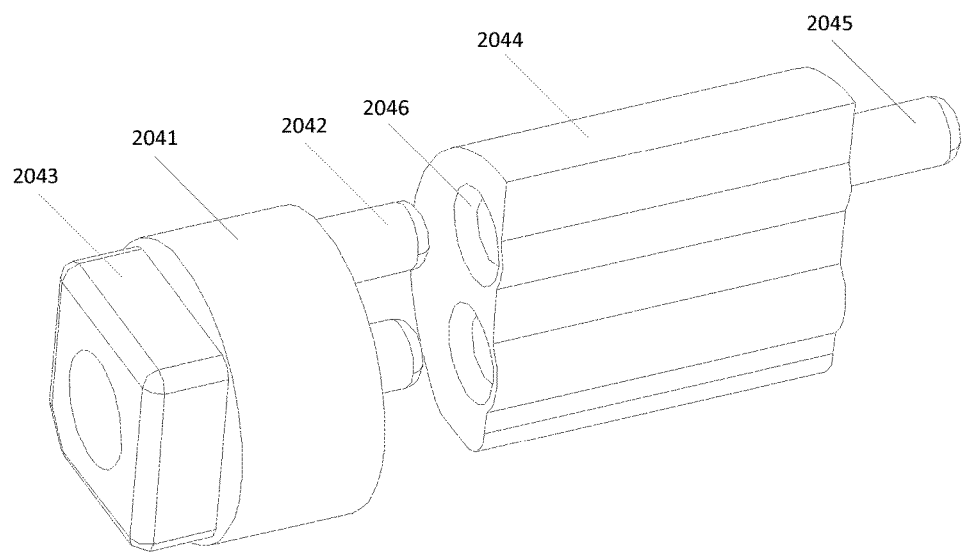
FIG. 6 is a schematic exploded structural view of the pivotal connector of the display apparatus in another embodiment of the present application.
Figure 7:
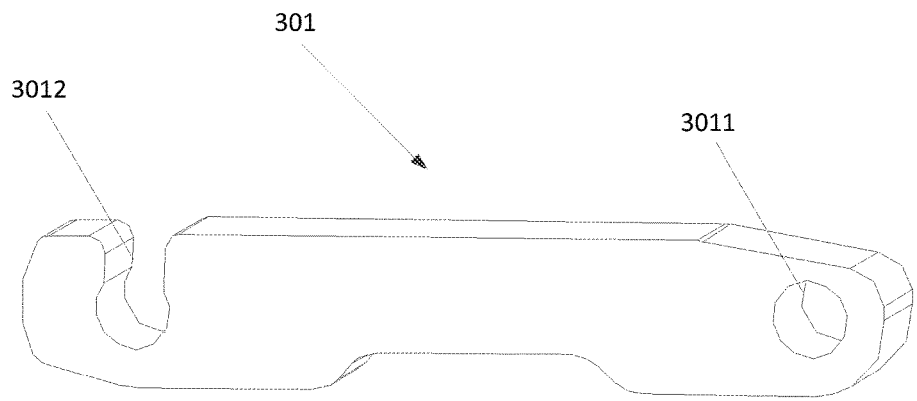
FIG. 7 is a schematic structural view of a first linkage of the display apparatus in an embodiment of the present application.

Referring to FIGS. 3, 4 and 7, the first terminal of the first linkage 301 is provided with a first pivot hole 3011, the first pivot hole 3011 is used for pin jointing to the first pivot post 2012, the second terminal of the first linkage 301 is provided with a first pivot slot 3012, the first pivot slot 3012 is used for pin jointing to the second linkage 302.

Figure 8:
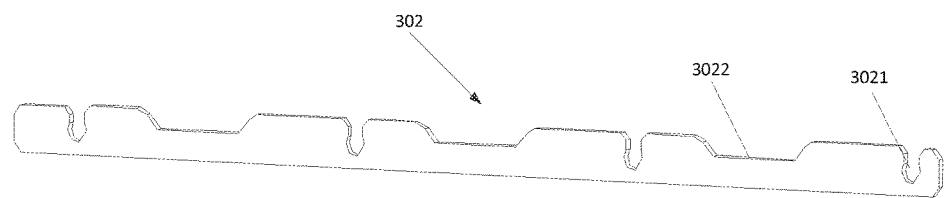
FIG. 8 is a schematic structural view of a second linkage of the display apparatus in an embodiment of the present application.
Figure 9:
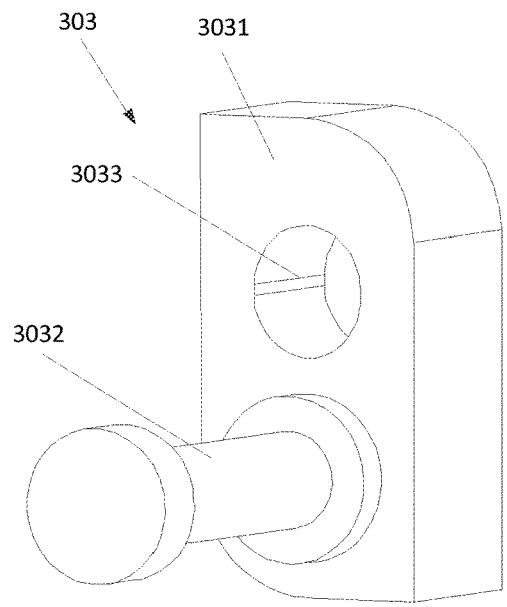
FIG. 9 is a schematic structural view of a first linkage connector of the display apparatus in an embodiment of the present application.
Figure 10:
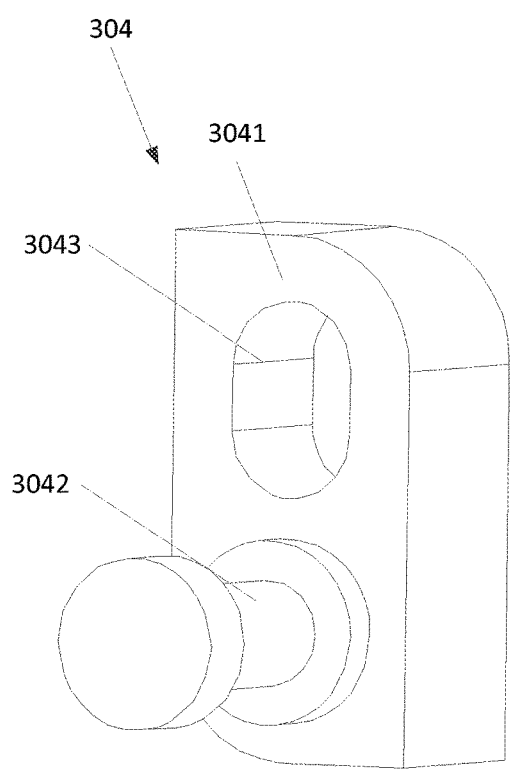
FIG. 10 is a schematic structural view of a second linkage connector of the display apparatus in an embodiment of the present application.

Referring to FIGS. 3 and 8, the second linkage 302 includes a plurality of second pivot slots 3021 and a plurality of stop slots 3022, the second pivot slot 3021 is used for pin jointing to the first linkage connector 303 and the second linkage connectors 304, respectively; the stop slot 3022 is used to make the second linkage 302 close to the housing 101 to move when the second linkage 302 is rotated.

Referring to FIGS. 3, 7 to 9, the first linkage connector 303 includes a second main body 3031, a second pivot post 3032 provided at a first terminal of the second main body 3031, the second pivot post 3032 is used for pin jointing to the first pivot slot 3012 and the corresponding second pivot slot 3021, respectively; a second pivot hole 3033 is provided at a second terminal of the second main body 3031, the second pivot hole 3033 is used for pin jointing to the middle frame 102.

Referring to FIGS. 3, 8 to 10, the second linkage connectors 304 includes a third main body 3041, a third pivot post 3042 is provided at a first terminal of the third main body 3041, the third main body 3041 is used for pin jointing to the corresponding second pivot slot 3021; a third pivot hole 3043 is provided at a second terminal of the third main body 3041, the third pivot hole 3043 is used for pin jointing to the middle frame 102; the length of the third pivot post 3043 is smaller than the length of the second pivot post 3032.

Figure 11:
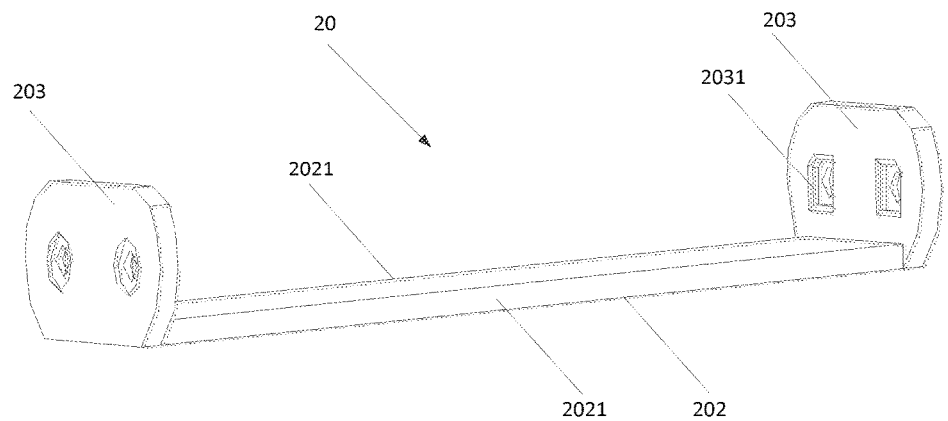
FIG. 11 is a schematic structural view of a connection frame plate of the display apparatus in an embodiment of the present application.
Figure 12:
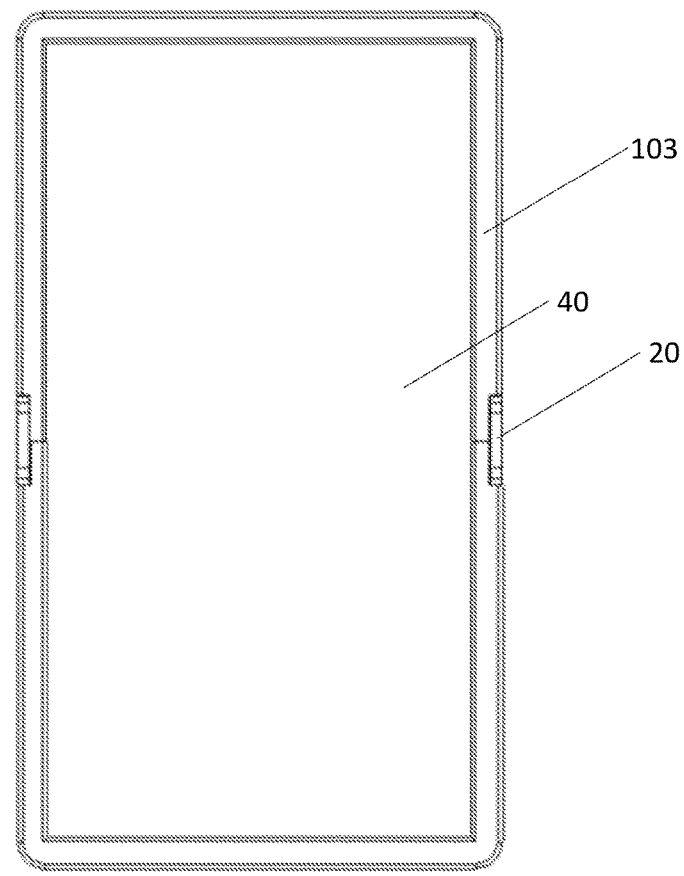
FIG. 12 is a schematic top view of the initial state of the display apparatus in an embodiment of the present application.
Figure 13:
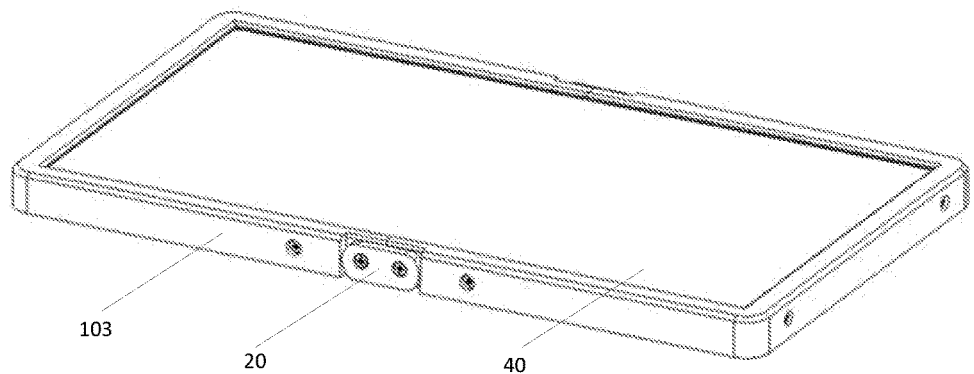
FIG. 13 is a schematic three-dimensional perspective view of the initial state of the display apparatus in an embodiment of the present application.

Referring to FIGS. 3, 4 and 11, the connection frame plate 20 includes a substrate 202 and two side plates 203 perpendicular to both sides of the substrate 202, the side plate 203 is provided with a irregular mounting hole 2031 to be fixedly connected to the fool-proofing fitting portion 2013; the substrate 202 includes two side edges 2021, the second terminals of the two housings 101 include abutment surfaces 1016, the two side edges 2021 is used for abutting against the abutment surfaces of the housing 101, respectively, to make the flexible display panel 40 and the entire display apparatus in an expanded state, as shown in FIGS. 12 and 13.

Figure 14:
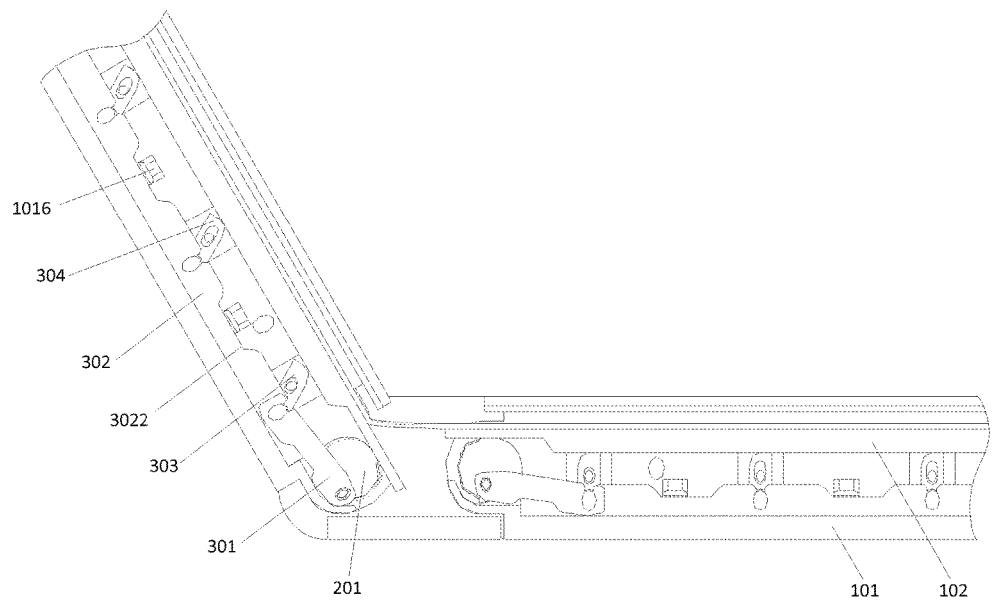
FIG. 14 is a schematic cross-sectional view of a folding process of the display apparatus in an embodiment of the present application.
Figure 15:
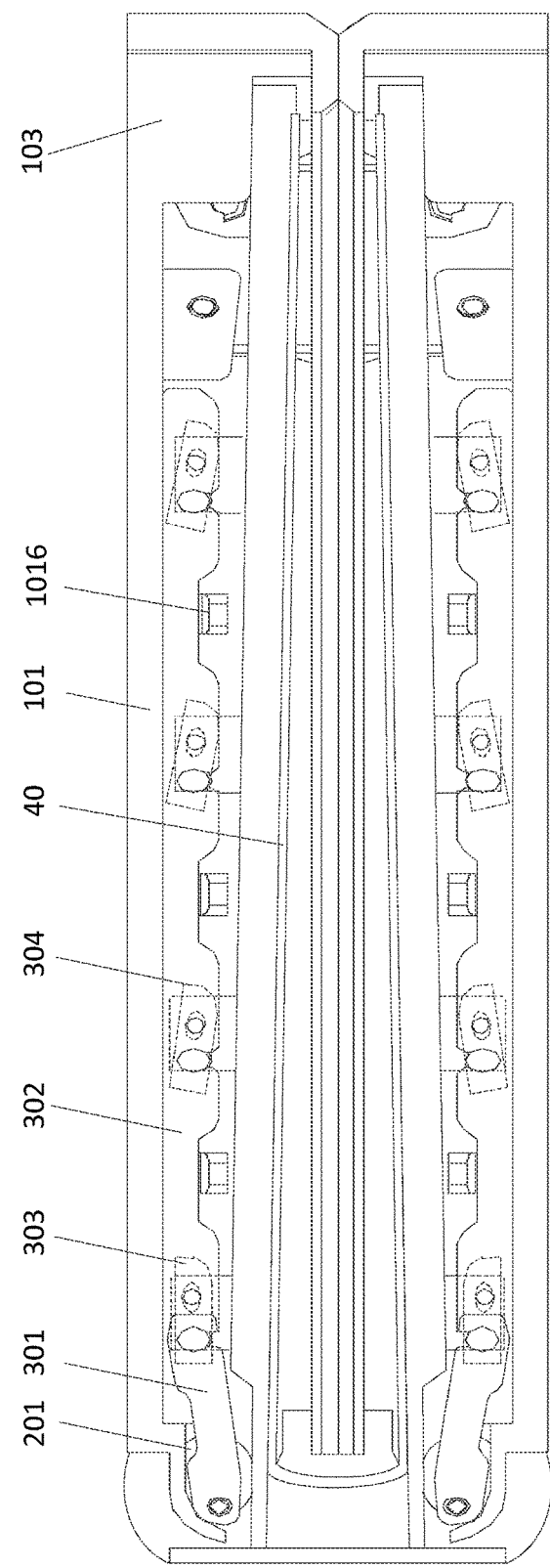
FIG. 15 is a schematic cross-sectional view of the folded state of the display apparatus in an embodiment of the present application.
Figure 16:
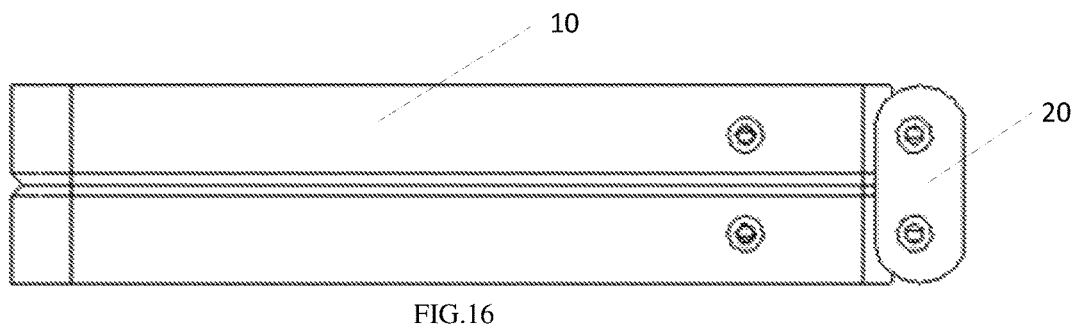
FIG. 16 is a schematic front view of the folded state of the display apparatus in an embodiment of the present application.
Figure 17:
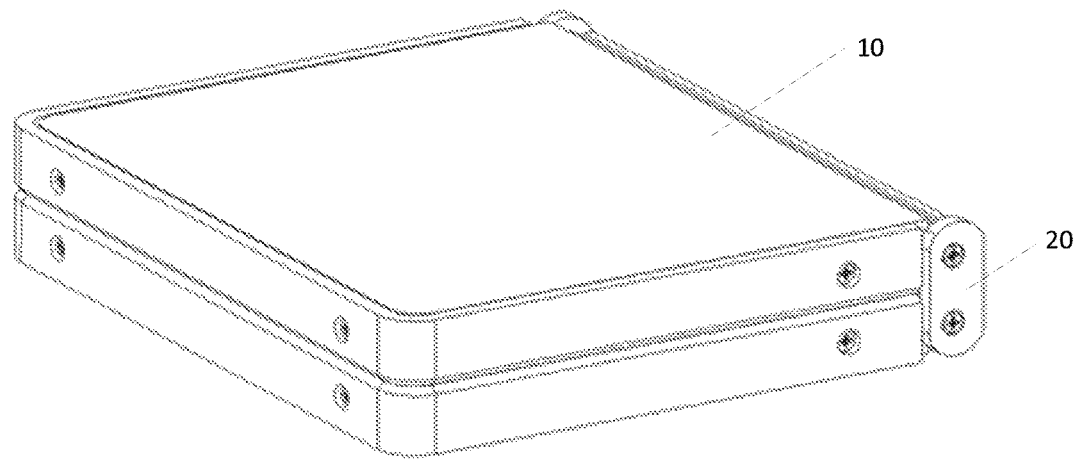
FIG. 17 is a schematic three-dimensional perspective view of the folded state of the display apparatus in an embodiment of the present application.

Referring to FIGS. 4, 14 and 15, the pivot portion 2011 of the pivot connector 201 is cylindrical shape, when the display apparatus is bent from the initial state, at least one of the housing 101 and the middle frame 102 in the housing assembly 10 starts to rotate around the center of the circle of the pivot portion 2011 pin jointed to the housing 101. Since the second terminal of the first linkage 301 is eccentrically pin jointed to the pivot connector 201, as the rotation of the display apparatus, the first linkage 301 is moved to the toward the folding region of the display apparatus with respect to the housing 101, the first terminal of the first linkage connector 303 pin jointed to the first terminal of the first linkage 301 is also moved toward the folding region of the display apparatus with respect to the housing 101, thereby causing the second linkage 302 pin jointed to the first terminal of the first linkage connector 303 to move toward the folding region of the display apparatus with respect to the housing 101. The housing 101 is provided with a stopper 106, the stopper 106 abuts against the stop slots 3022, so that the second linkage 302 is not moved in a direction perpendicular to the bottom wall of the housing 101 during the movement of the second linkage 302 toward the folding region of the display apparatus with respect to the housing 101. By the movement of the second linkage 302, the second link connector 304 pin jointed to the second linkage 302 is driven to move toward the folding region of the display apparatus with respect to the housing 101, the second terminals of the middle frame 102 respectively pin jointed to the first linkage connector 303 and the second link connector 304 abuts against toward the second terminal of the housing 101, until the surfaces of the two front frames 103 are in contact, the projections of the two housings 101 and the two middle frames 102 are coincided in the horizontal plane, and the display apparatus is in a bent state, as shown in FIGS. 16 and 17. At this time, the distance between the second terminals of the two middle frames 102 is greater than the distance between the first terminals of the two middle frames 102, so that the bending perimeter of the folding region of the flexible display panel 40 is increased to release the stress.

In the embodiment of the present application, by providing the pivoting connectors and the linkage in the display apparatus, the housing assembly is pin jointed, such that the two housings in the housing assembly are rotationally folded with respect to the connection frame plate, the distance between the second terminals of the two middle frames is greater than the distance between the first terminals of the two middle frames, so that the bending perimeter of the folding region of the flexible display panel in the display apparatus is increased to release the stress, and to prevent the folding region from broken or damaged due to stress, when the display apparatus is folded or expanded, to improve the reliability of the display apparatus.

Above are embodiments of the present application, which does not limit the scope of the present application. Any modifications, equivalent replacements or improvements within the spirit and principles of the embodiment described above should be covered by the protected scope of the invention.

What is claimed is:

1. A display apparatus, comprising:
a housing assembly comprising two housings and two middle frames, wherein first terminals of the middle frames are pin jointed to first terminals of the housings;
a connection frame plate comprising a pivot connector, second terminals of the two housings are pin jointed to the pivot connector;
a linkage comprising a first linkage, a second linkage, a first linkage connector, and a plurality of second linkage connectors, a first terminal of the first linkage pin jointed to the second linkage connector, a second terminal of the first linkage eccentrically pin jointed to the pivot connector, the second linkage respectively pin jointed to the first linkage connector and the plurality of second linkage connectors, the first linkage connector and the plurality of second linkage connectors respectively pin jointed to at least one of the two middle frames;
a flexible display panel disposed on surfaces of the two middle frames;
wherein the second terminals of the two middle frames abut against the second terminals of the housings when the two housings rotationally folded with respect to the connection frame plate to make a distance between the second terminals of the two middle frames is greater than a distance between the first terminals of the two middle frames, and the bending perimeter of a folding region of the flexible display panel increased to release the stress;
the pivot connector comprising a pivot portion, a first pivot post disposed on a side of the pivot portion, the pivot portion used for pin jointing to the housing, the first pivot post used for pin jointing to the second terminal of the first linkage; and
the two housings respectively comprising a bottom wall and a side wall connected to the bottom wall, the two middle frames opposite disposed to the bottom walls of the two housings, respectively, when the two housings bent, the distance between the second terminals of the two middle frames and the bottom wall is reduced.

2. The display apparatus according to claim 1, wherein the pivot connector further comprises a fool-proofing fitting portion disposed on the other side of the pivot portion, the pivot portion used for fixed fitting with the connection frame plate.

3. The display apparatus according to claim 2, wherein the connection frame plate comprises a substrate and two side plates perpendicular to both sides of the substrate, the side plate is provided with an irregular mounting hole to be fixedly connected to the fool-proofing fitting portion; the substrate comprises two side edges, the second terminals of the two housings comprises abutment surfaces, the two side edges are used for abutting against the abutment surfaces of the housing, respectively.

4. The display apparatus according to claim 2, wherein the first terminals of the middle frame are respectively provided with first mounting holes, and the side walls of the two housings are respectively provided with second mounting holes, the first mounting holes and the second mounting holes are fixed by fixing members to pin joint the two housings to the two middle frames.

5. The display apparatus according to claim 1, wherein the first terminal of the first linkage is provided with a first pivot hole, the first pivot hole is used for pin jointing to the first pivot post, the second terminal of the first linkage is provided with a first pivot slot, the first pivot slot is used for pin jointing to the second linkage.

6. The display apparatus according to claim 5, wherein the second linkage comprises a plurality of second pivot slots and a plurality of stop slots, the second pivot slots are used for pin jointing to the first linkage connector and the second linkage connector, respectively; the stop slot is used to make the second linkage close to the housing to move when the second linkage rotated.

7. The display apparatus according to claim 6, wherein the first linkage connector comprises a second main body, a second pivot post disposed on a first terminal of the second main body, the second pivot post is used for pin jointing to the first pivot slot and the corresponding second pivot slot, respectively; a second pivot hole is provided at a second terminal of the second main body, the second pivot hole is used for pin jointing to the middle frame.

8. The display apparatus according to claim 7, wherein the second linkage connectors comprises a third main body, a third pivot post disposed on a first terminal of the third main body, the third main body is used for pin jointing to the corresponding second pivot slot; a third pivot hole is provided at a second terminal of the third main body, the third pivot hole is used for pin jointing to the middle frame; the length of the third pivot post is smaller than the length of the second pivot post.

9. A display apparatus, comprising:
a housing assembly comprising two housings and two middle frames, wherein first terminals of the middle frames are pin jointed to first terminals of the housings;
a connection frame plate comprising a pivot connector, second terminals of the two housings are pin jointed to the pivot connector;
a linkage comprising a first linkage, a second linkage, a first linkage connector, and a plurality of second linkage connectors, a first terminal of the first linkage pin jointed to the second linkage connector, a second terminal of the first linkage eccentrically pin jointed to the pivot connector, the second linkage respectively pin jointed to the first linkage connector and the plurality of second linkage connectors, the first linkage connector and the plurality of second linkage connectors respectively pin jointed to at least one of the two middle frames;
a flexible display panel disposed on surfaces of the two middle frames; and
wherein the second terminals of the two middle frames abut against the second terminals of the housings when the two housings rotationally folded with respect to the connection frame plate to make a distance between the second terminals of the two middle frames is greater than a distance between the first terminals of the two middle frames, and the bending perimeter of a folding region of the flexible display panel increased to release the stress.

10. The display apparatus according to claim 9, wherein the pivot connector comprises a pivot portion, a first pivot post is disposed on a side of the pivot portion, the pivot portion is used for pin jointing to the housing, the first pivot post is used for pin jointing to the second terminal of the first linkage.

11. The display apparatus according to claim 10, wherein the pivot connector further comprises a fool-proofing fitting portion disposed on the other side of the pivot portion, the pivot portion used for fixed fitting with the connection frame plate.

12. The display apparatus according to claim 10, wherein the first terminal of the first linkage is provided with a first pivot hole, the first pivot hole is used for pin jointing to the first pivot post, the second terminal of the first linkage is provided with a first pivot slot, the first pivot slot is used for pin jointing to the second linkage.

13. The display apparatus according to claim 12, wherein the second linkage comprises a plurality of second pivot slots and a plurality of stop slots, the second pivot slots are used for pin jointing to the first linkage connector and the second linkage connector, respectively; the stop slot is used to make the second linkage close to the housing to move when the second linkage rotated.

14. The display apparatus according to claim 13, wherein the first linkage connector comprises a second main body, a second pivot post disposed on a first terminal of the second main body, the second pivot post is used for pin jointing to the first pivot slot and the corresponding second pivot slot, respectively; a second pivot hole is provided at a second terminal of the second main body, the second pivot hole is used for pin jointing to the middle frame.

15. The display apparatus according to claim 14, wherein the second linkage connectors comprises a third main body, a third pivot post disposed on a first terminal of the third main body, the third main body is used for pin jointing to the corresponding second pivot slot; a third pivot hole is provided at a second terminal of the third main body, the third pivot hole is used for pin jointing to the middle frame; the length of the third pivot post is smaller than the length of the second pivot post.

16. The display apparatus according to claim 11, wherein the connection frame plate comprises a substrate and two side plates perpendicular to both sides of the substrate, the side plate is provided with an irregular mounting hole to be fixedly connected to the fool-proofing fitting portion; the substrate comprises two side edges, the second terminals of the two housings comprises abutment surfaces, the two side edges are used for abutting against the abutment surfaces of the housing, respectively.

17. The display apparatus according to claim 9, wherein the two housings respectively comprise a bottom wall and a side wall connected to the bottom wall, the two middle frames opposite disposed to the bottom walls of the two housings, respectively, when the two housings bent, the distance between the second terminals of the two middle frames and the bottom wall is reduced.

18. The display apparatus according to claim 9, wherein the first terminals of the middle frame are respectively provided with first mounting holes, and the side walls of the two housings are respectively provided with second mounting holes, the first mounting holes and the second mounting holes are fixed by fixing members to pin joint the two housings to the two middle frames.

\* \* \* \* \*